(12) United States Patent
Uchiyama

(10) Patent No.: US 7,555,265 B2
(45) Date of Patent: Jun. 30, 2009

(54) INFORMATION DELIVERY SYSTEM, INFORMATION DELIVERY METHOD, MOBILE UNIT, SERVER, AND INFORMATION DELIVERY TERMINAL

(75) Inventor: Jirou Uchiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 848 days.

(21) Appl. No.: 11/023,385

(22) Filed: Dec. 29, 2004

(65) Prior Publication Data

US 2005/0148360 A1 Jul. 7, 2005

(30) Foreign Application Priority Data

Jan. 5, 2004 (JP) .............................. 2004-000456

(51) Int. Cl.
*H04B 7/00* (2006.01)

(52) U.S. Cl. .................. 455/41.2; 455/414.1; 455/466; 455/410; 455/411; 455/412.1; 455/435.1; 455/41.3; 455/552.1

(58) Field of Classification Search .............. 455/414.1, 455/466, 410, 411, 412.1, 412.2, 435.1, 41.2, 455/41.3, 552.1
See application file for complete search history.

(56) References Cited

U.S. PATENT DOCUMENTS

| | | | |
|---|---|---|---|
| 7,216,231 B2 * | 5/2007 | Gehrmann | 713/171 |
| 7,319,862 B1 * | 1/2008 | Lincoln et al. | 455/414.1 |
| 2003/0032409 A1 * | 2/2003 | Hutcheson et al. | 455/414 |
| 2003/0149875 A1 | 8/2003 | Hosaka | |
| 2004/0147270 A1 * | 7/2004 | Petrovich | 455/456.3 |

FOREIGN PATENT DOCUMENTS

| | | |
|---|---|---|
| EP | 1 024 626 | 8/2000 |
| EP | 1 233 570 | 8/2002 |
| JP | 2002-077999 | 8/2000 |
| JP | 2001-103003 | 4/2001 |
| JP | 2003-235076 | 8/2003 |
| WO | WO 02/01902 A1 | 6/2000 |

OTHER PUBLICATIONS

Nguyen et al. "Secure authorization, access control, and data integrity in bluetooth" 10th IEEE International Conference; Aug. 27, 2002.
Berger et al. "Web Services on Mobile- Devices Implementation and Experience" 5th IEEE Workshop on Mobile Computing ; Oct. 9, 2003 pp. 428-433.
European Search report dated May 4, 2006.
Japanese Office Action with Translation.

* cited by examiner

*Primary Examiner*—Lana N Le
*Assistant Examiner*—Ping Y Hsieh
(74) *Attorney, Agent, or Firm*—Whitham Curtis Christofferson & Cook, PC

(57) ABSTRACT

In an information delivery system, information desired by the user can be obtained while improving security of the system. A portable terminal registers a condition of an information delivery terminal to acquire information therefrom to a server. The server selects, from information of plural information delivery terminals, information of an information delivery terminal satisfying the condition, creates link information required for a link with the information delivery terminal satisfying the condition, and sends the link information to the portable terminal. The server delivers link information required for a link with the portable terminal to the information delivery terminal. The information delivery terminal automatically establishes a Bluetooth link with only the portable terminal according to the link information received from the server to provide information to the portable terminal.

11 Claims, 9 Drawing Sheets

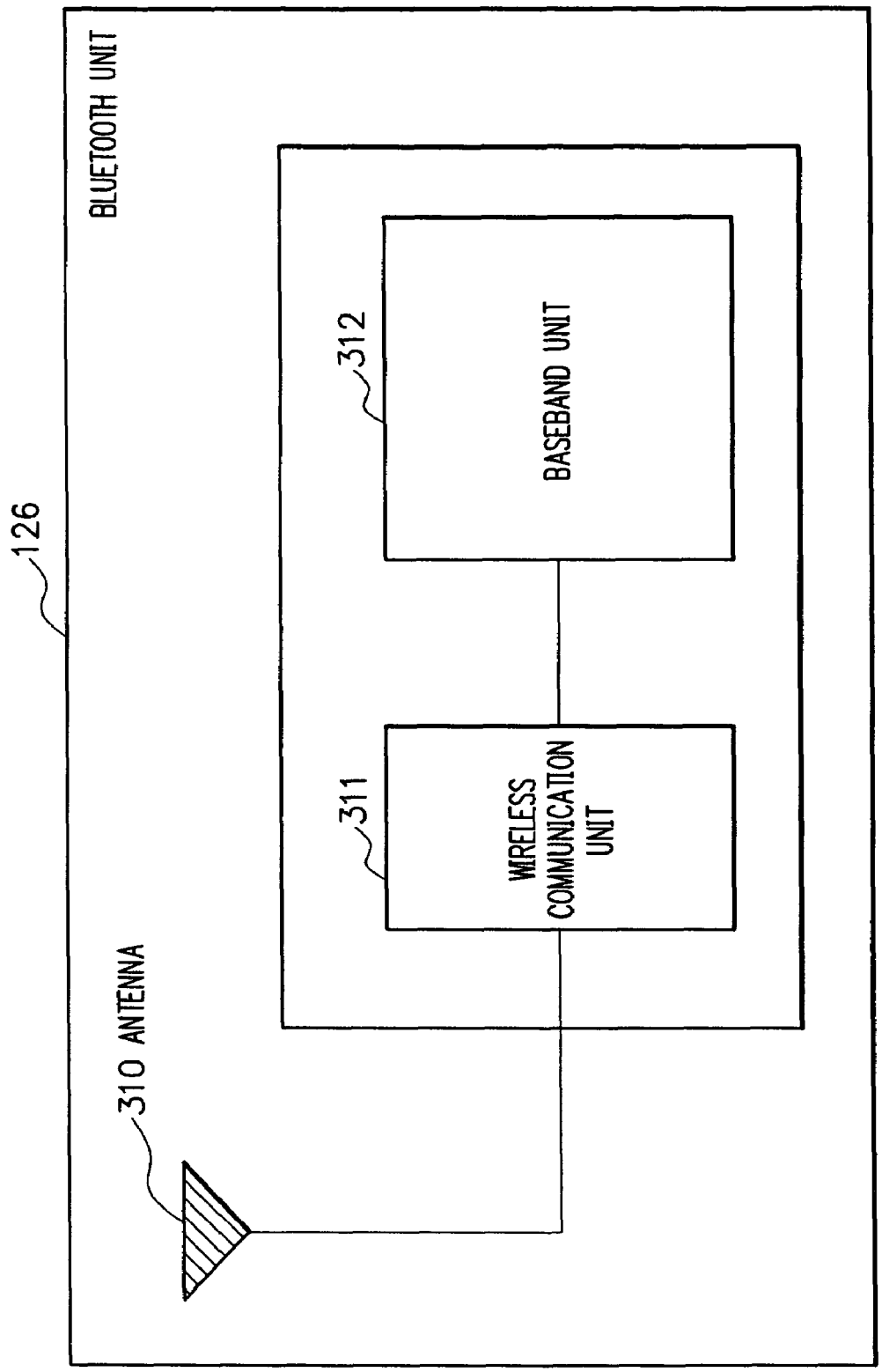

FIG. 4

213 INFORMATION DELIVERY TERMINAL DATABASE

| | 400 | 401 | 402 | 403 |
|---|---|---|---|---|
| ITEM 1 | INFORMATION DELIVERY TERMINAL A | CONTENT GENRE A | REGION A | INFORMATION DELIVERY TERMINAL BLUETOOTH ADDRESS 1 |
| ITEM 2 | INFORMATION DELIVERY TERMINAL B | CONTENT GENRE B | REGION A | INFORMATION DELIVERY TERMINAL BLUETOOTH ADDRESS 2 |
| ITEM 3 | INFORMATION DELIVERY TERMINAL C | CONTENT GENRE C | REGION A | INFORMATION DELIVERY TERMINAL BLUETOOTH ADDRESS 3 |
| ITEM 4 | INFORMATION DELIVERY TERMINAL D | CONTENT GENRE A | REGION B | INFORMATION DELIVERY TERMINAL BLUETOOTH ADDRESS 4 |
| ITEM 5 | INFORMATION DELIVERY TERMINAL E | CONTENT GENRE B | REGION B | INFORMATION DELIVERY TERMINAL BLUETOOTH ADDRESS 5 |
| ITEM 6 | INFORMATION DELIVERY TERMINAL F | CONTENT GENRE C | REGION B | INFORMATION DELIVERY TERMINAL BLUETOOTH ADDRESS 6 |

F I G. 5

212 USER INFORMATION DATABASE

| | 400 | 411 | 412 | 413 |
|---|---|---|---|---|
| ITEM 1 | INFORMATION DELIVERY TERMINAL A | USER NAME 1 | USER TERMINAL BLUETOOTH ADDRESS 1 | PIN CODE 1 |
| ITEM 2 | INFORMATION DELIVERY TERMINAL B | USER NAME 2 | USER TERMINAL BLUETOOTH ADDRESS 2 | PIN CODE 2 |
| ITEM 3 | INFORMATION DELIVERY TERMINAL C | USER NAME 3 | USER TERMINAL BLUETOOTH ADDRESS 3 | PIN CODE 3 |
| ITEM 4 | INFORMATION DELIVERY TERMINAL D | USER NAME 4 | USER TERMINAL BLUETOOTH ADDRESS 4 | PIN CODE 4 |
| ITEM 5 | INFORMATION DELIVERY TERMINAL E | USER NAME 5 | USER TERMINAL BLUETOOTH ADDRESS 5 | PIN CODE 5 |
| ITEM 6 | INFORMATION DELIVERY TERMINAL F | USER NAME 6 | USER TERMINAL BLUETOOTH ADDRESS 6 | PIN CODE 6 |

F I G. 7

236 LINK INFORMATION DATABASE

| | 411 | 412 | 413 | 603 |
|---|---|---|---|---|
| ITEM 1 | INFORMATION DELIVERY TERMINAL A | INFORMATION DELIVERY TERMINAL BLUETOOTH ADDRESS 1 | PIN CODE 1 | LINK KEY 1 |
| ITEM 2 | INFORMATION DELIVERY TERMINAL B | INFORMATION DELIVERY TERMINAL BLUETOOTH ADDRESS 2 | PIN CODE 2 | LINK KEY 2 |
| ITEM 3 | INFORMATION DELIVERY TERMINAL C | INFORMATION DELIVERY TERMINAL BLUETOOTH ADDRESS 3 | PIN CODE 3 | |

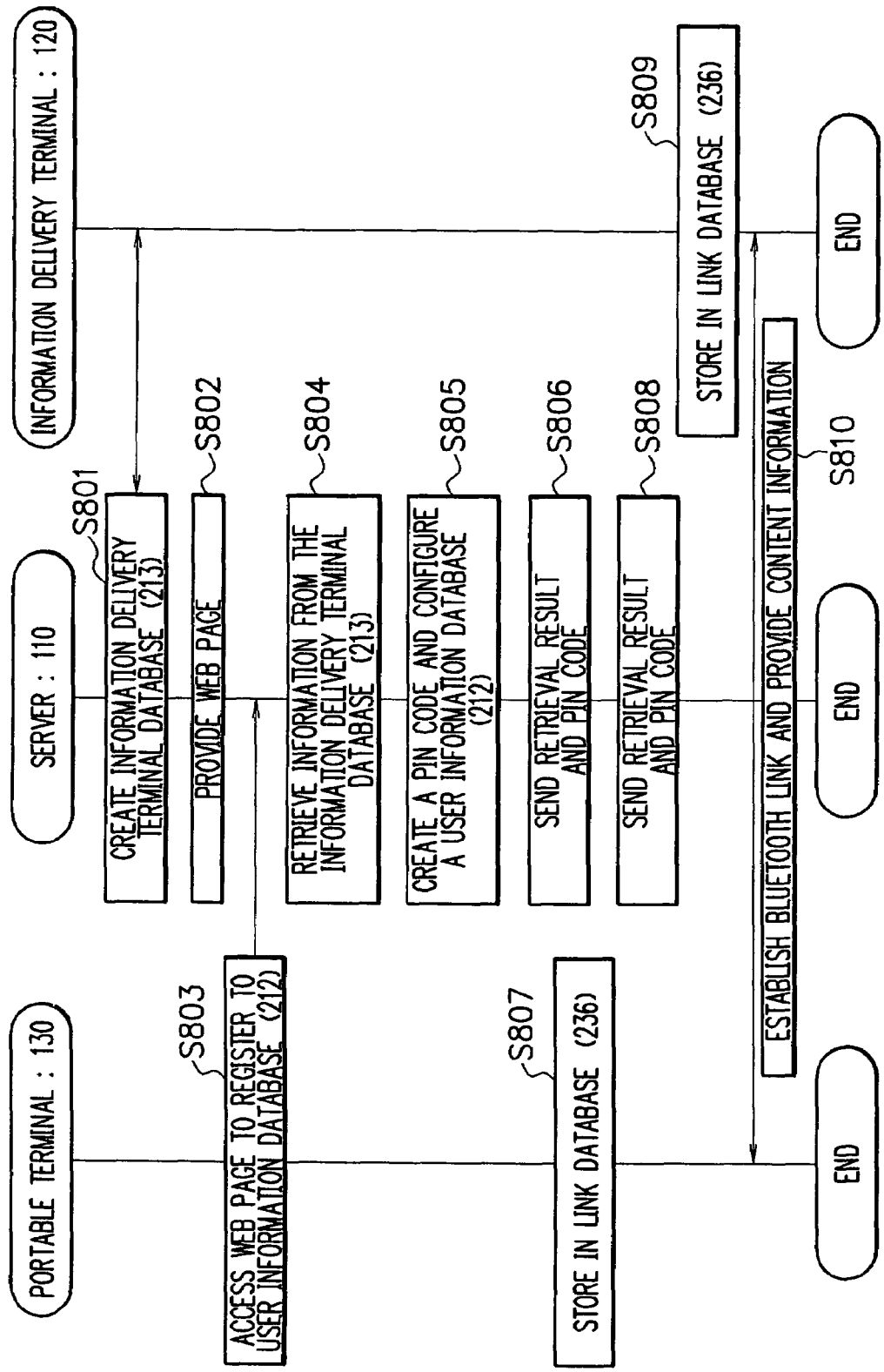

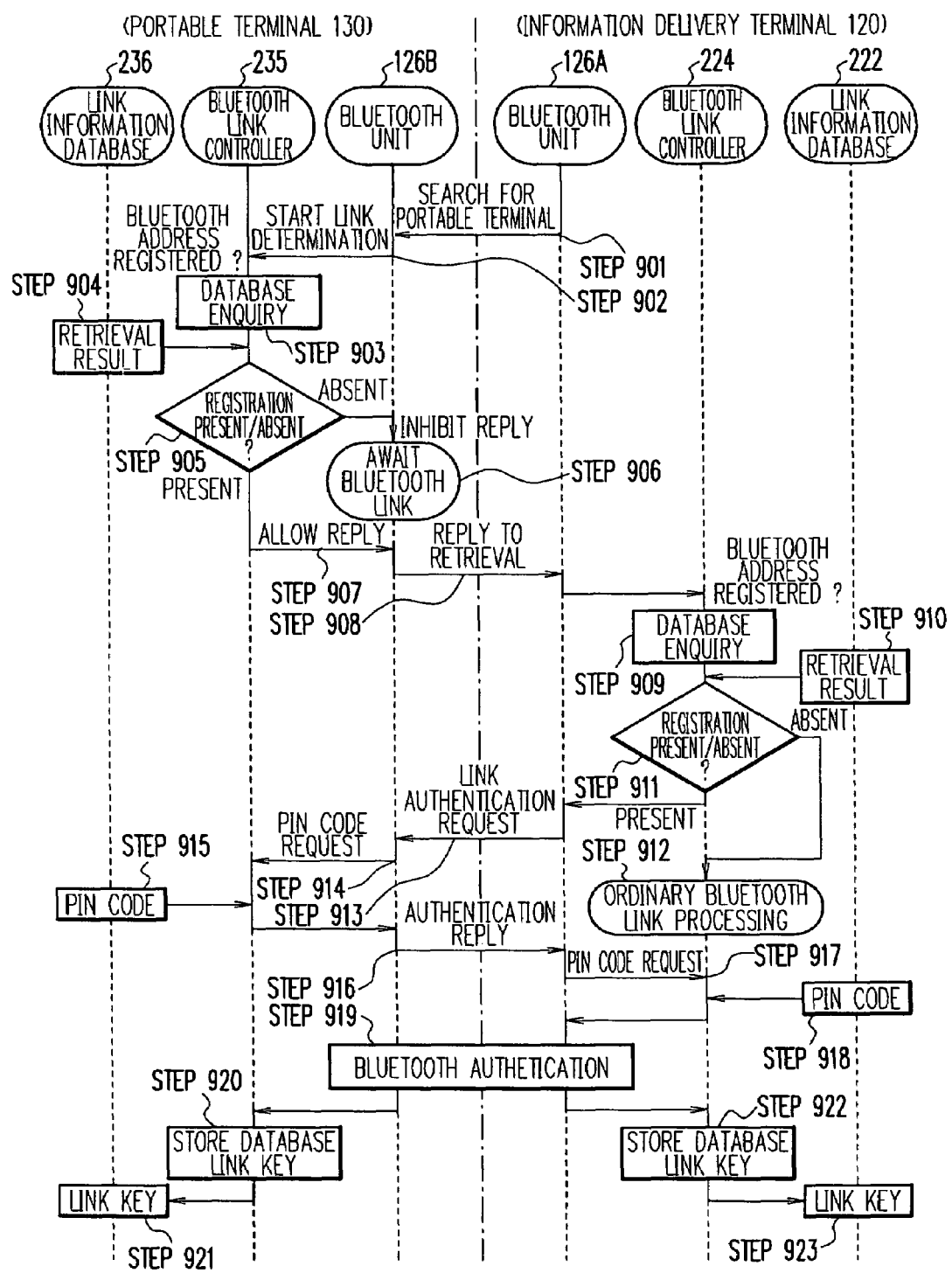

INFORMATION DELIVERY SYSTEM, INFORMATION DELIVERY METHOD, MOBILE UNIT, SERVER, AND INFORMATION DELIVERY TERMINAL

BACKGROUND OF THE INVENTION

1. Field of the Invention

The present invention relates to an information delivery system and an information delivery method in which a portable terminal using a short-distance wireless system, particularly, Bluetooth is employed and a mobile unit, a server, and an information delivery terminal for use in the information delivery system and method, and in particular, to an information delivery system and an information delivery method in which information meeting needs of a user is delivered to the portable terminal without imposing any load on the user while guaranteeing high security and a mobile unit, a server, and an information delivery terminal for use in the information delivery system and method.

2. Description of the Prior Art

Recently, an information delivery service has been developed using wireless communication. For such a wireless communication system, Bluetooth is available. In Bluetooth, authentication of a user is beforehand conducted using a Personal Identification Number (PIN) to allow communication between terminals. However, an information delivery system adopting Bluetooth is attended with problems as below.

First, an information delivery side cannot determine a user and does not include any unit to confirm needs of users. Therefore, the delivery side sends information to the users in a one-sided way, i.e., according to only his or her decision. Users cannot necessarily receive desired information from the information delivery side.

Second, the user side does not include any device to determine an information delivery terminal used to obtain therefrom information desired by the user. Therefore, it is necessary for the user side to first establish a Bluetooth link to all information delivery terminals. The user side then selects an information delivery terminal desired by the user. This is troublesome in operation and there may occur a disadvantage of establishing a link or connection to an information delivery terminal not desired by the user.

As above, in the conventional information delivery system utilizing Bluetooth, the information delivery side cannot determine any particular user and hence transmits information only to the users in a one-sided way. On the side of users, it is difficult to receive information meeting needs of the user. To attain information from the information delivery side, it is required for the user side to accept a connection request from any information delivery side, the information delivery module being not particularly specified in advance. This leads to a problem of security. There also arises a problem of load imposed on the user side. For example, when many connection or link requests are received, it is necessary for the user side to select therefrom a desired one of the terminals on the information delivery side.

Japanese Patent Laid-Open Publication Ser. No. 2001-103003 filed before the present invention describes a technique in which an information providing side sends a message to a mobile unit satisfying a condition to urge a visit before the mobile unit makes a visit.

In accordance with the technique of this article, there is provided an information providing system for mobile units including a plurality of mobile units, a plurality of information providing terminals, and an information center. The information center includes a mobile unit information database having recorded information of the mobile units and a required condition database having stored a required condition for a mobile unit desired by the information providing side. Using the databases, the information center determines a mobile unit required by the information providing side and then sends information of the mobile unit to the information providing terminals. When the information is received, each information providing terminal displays on its display the information of the mobile unit, creates a message using the information, and sends the message to the mobile unit. Having received the message, the mobile unit displays the message on its display. As a result, the information is transmitted to only the mobile unit required by the information provider and is displayed on a display of the mobile unit.

SUMMARY OF THE INVENTION

However, according to the technique described in Japanese Patent Laid-Open Publication Ser. No. 2001-103003, a message is created using information of a mobile unit received from the information center side and is transmitted to the mobile unit so that information is sent to only the mobile unit required on the information providing side. Therefore, depending on the message created on the information provider side, information required by the mobile unit side cannot be necessarily received.

It is therefore an object of the present invention, which has been devised in consideration of the problem, to provide an information delivery system, an information delivery method, a mobile unit, a server, and an information delivery terminal in which information desired by the user can be obtained in any situation while improving security.

To achieve the object, the present invention has aspects as follows.

In accordance with the present invention, there is provided an information delivery system comprising a mobile unit, a plurality of information delivery terminals for providing information to the mobile unit, and a server for providing information to the mobile unit and the information delivery terminals. The mobile unit comprises a unit for registering to the server a condition of one of the information delivery terminals from which the information is obtained, a unit for receiving, from the server, link information required for a link with the information delivery terminal, and a unit for establishing a Bluetooth link with the information delivery terminal according to the link information received from the server and thereby acquiring the information. The server comprises an information delivery terminal database for storing therein information of the information delivery terminals providing information to the mobile unit, a unit for acquiring, from the information delivery terminal database, information of an information delivery terminal satisfying the condition of the information delivery terminal registered by the mobile unit, creating link information required for a link with the information delivery terminal satisfying the condition, and transmitting the link information to the mobile unit, and a unit for transmitting link information required for a link with the mobile unit to the information delivery terminal satisfying the condition of the information delivery terminal registered by the mobile unit. The information delivery terminal comprises a unit for establishing, according to the link information received from the server, a Bluetooth link with only the mobile unit having received the link information from the server, and for providing information to the mobile unit.

In the information delivery system, the server comprises an information database for storing therein the information of the mobile unit having registered the condition of the information delivery terminal and the link information required for a link with the mobile unit, with a relationship established among the information of the mobile unit, the link information, and an information delivery terminal name satisfying the condition.

Also, in the information delivery system, the server comprises a unit for providing the mobile unit with information of a plurality of information delivery terminals providing the information. The mobile unit registers to the server, according to the information of the plural information delivery terminals provided by the server, the condition of the information delivery terminal from which the information is acquired.

In the information delivery system, the information delivery terminal automatically establishes, according to the link information, a Bluetooth link with only the mobile unit having received the link information, and provides information to the mobile unit. The mobile unit obtains the information.

In the information delivery system, the link information which the information delivery terminal received from the server includes at least a Bluetooth address of the mobile unit with which a Bluetooth link is established and a personal identification number (PIN) code arbitrarily created by the server. The link information which the mobile unit receives from the server includes at least a Bluetooth address of the information delivery terminal with which a Bluetooth link is established and a PIN code arbitrarily created by the server. The information delivery terminal comprises a unit for establishing a Bluetooth link with the mobile unit using at least one item selected from among an information delivery terminal Bluetooth address possessed by the information delivery terminal, the Bluetooth address of the mobile unit, and the PIN code arbitrarily created by the server and provides the information to the mobile unit. The mobile unit comprises a unit for establishing a Bluetooth link with the information delivery terminal using at least one item selected from among a mobile unit Bluetooth address possessed by the mobile unit, the Bluetooth address of the information delivery terminal, and the PIN code arbitrarily created by the server and acquires the information.

In the information delivery system, the information delivery terminal comprises a unit for transmitting the information delivery terminal Bluetooth address possessed by the information delivery terminal to the mobile unit, a unit for determining, when the mobile unit Bluetooth address possessed by the mobile unit is received from the mobile unit having received the information delivery terminal Bluetooth address, whether or not the mobile unit Bluetooth address is present in the link information and for transmitting, when it is determined that the mobile unit Bluetooth address is present in the link information, a link authentication request for a Bluetooth link with the mobile unit to the mobile unit, and a unit for conducting the Bluetooth authentication with the mobile unit at reception of the PIN code from the mobile unit having received the link authentication request if the PIN code thus received matches the PIN code included in the link information. The information delivery terminal provides the information to the mobile unit. The mobile unit comprises a unit for determining, when the information delivery terminal Bluetooth address possessed by the information delivery terminal is received from the information delivery terminal, whether or not the information delivery terminal Bluetooth address is present in the link information and for transmitting, when it is determined that the information delivery terminal Bluetooth address is present in the link information, the mobile unit Bluetooth address possessed by the mobile unit to the information delivery terminal, a unit for transmitting, when the link authentication request is received from the information delivery terminal having transmitted the mobile unit Bluetooth address, the PIN code included in the link information to the information delivery terminal, and a unit for conducting the Bluetooth authentication with the information delivery terminal having transmitted the PIN code. The mobile unit acquires the information.

In the information delivery system, the information delivery terminal creates a link key when the information delivery terminal conducts the Bluetooth authentication with the mobile unit. The information delivery terminal comprises a link database for storing therein the link key together with the link information. The mobile unit creates a link key when the mobile unit conducts the Bluetooth authentication with the information delivery terminal. The mobile unit comprises a link database for storing therein the link key together with the link information.

In accordance with the present invention, there is provided an information delivery method for use with an information delivery system comprising a mobile unit, a plurality of information delivery terminals for providing information to the mobile unit, and a server for providing information to the mobile unit and the information delivery terminals. The method comprises the steps of registering by the mobile unit to the server a condition of one of the information delivery terminals from which the information is obtained, acquiring by the server, from the information delivery terminal database having stored information of the plural information delivery terminals providing information to the mobile unit, information of an information delivery terminal satisfying the condition of the information delivery terminal registered by the mobile unit, creating link information required for a link with the information delivery terminal satisfying the condition, and transmitting the link information to the mobile unit; receiving by the mobile unit, from the server, the link information required for a link with the information delivery terminal; transmitting by the server, link information required for a link with the mobile unit to the information delivery terminal satisfying the condition of the information delivery terminal registered by the mobile unit; and receiving by the information delivery terminal the link information from the server, establishing a Bluetooth link with only the mobile unit having received the link information from the server, and providing information to the mobile unit.

The information delivery method further comprises the step of storing in an information database the information of the mobile unit having registered the condition of the information delivery terminal and the link information required for a link with the mobile unit, with a relationship established among the information of the mobile unit, the link information, and an information delivery terminal name satisfying the condition.

The information delivery method further comprises the steps of providing, by the server, the mobile unit with information of the plural information delivery terminals providing the information; and registering by the mobile unit to the server, according to the information of the plural information delivery terminals provided by the server, the condition of the information delivery terminal from which the information is acquired.

The information delivery method further comprises the steps of automatically establishing by the information delivery terminal, according to the link information, a Bluetooth link with only the mobile unit having received the link information and providing information to the mobile unit.

In the information delivery method, the link information which the information delivery terminal received from the server includes at least a Bluetooth address of the mobile unit with which a Bluetooth link is established and a PIN code arbitrarily created by the server. The link information which the mobile unit receives from the server includes at least a Bluetooth address of the information delivery terminal with which a Bluetooth link is established and a PIN code arbitrarily created by the server. The method further comprises the steps of transmitting by the information delivery terminal the information delivery terminal Bluetooth address possessed by the information delivery terminal to the mobile unit, determining by the mobile unit, when the information delivery terminal Bluetooth address possessed by the information delivery terminal is received from the information delivery terminal, whether or not the information delivery terminal Bluetooth address is present in the link information and transmitting, when it is determined that the information delivery terminal Bluetooth address is present in the link information, the mobile unit Bluetooth address possessed by the mobile unit to the information delivery terminal; determining by the information delivery terminal, when the mobile unit Bluetooth address possessed by the mobile unit is received from the mobile unit, whether or not the mobile unit Bluetooth address is present in the link information and transmitting, when it is determined that the mobile unit Bluetooth address is present in the link information, a link authentication request for a Bluetooth link with the mobile unit to the mobile unit; transmitting by the mobile unit, when the link authentication request is received from the information delivery terminal, the PIN code included in the link information to the information delivery terminal; and conducting by the information delivery terminal the Bluetooth authentication with the mobile unit at reception of the PIN code from the mobile unit if the PIN code thus received matches the PIN code included in the link information and providing the information to the mobile unit.

The information delivery method further comprises the steps of creating by the information delivery terminal a link key when the information delivery terminal conducts the Bluetooth authentication with the mobile unit and storing the link key together with the link information in a link database possessed by the information delivery terminal; and creating by the mobile unit a link key when the mobile unit conducts the Bluetooth authentication with the information delivery terminal and storing the link key together with the link information in a link database possessed by the mobile unit.

In accordance with the present invention, there is provided a mobile unit for establishing a Bluetooth link with an information delivery terminal providing information, the mobile unit thereby acquiring the information. The mobile unit comprises a unit for registering, to a server linked via a network thereto, a condition of an information delivery terminal from which the information is acquired; a unit for receiving, from the server, link information required for a link with an information delivery terminal satisfying the condition; and a unit with which a Bluetooth link is automatically established by the information delivery terminal matching the link information received from the server and which acquires the information from the information delivery terminal.

In the mobile unit, the link information received from the server includes at least a Bluetooth address of the information delivery terminal with which a Bluetooth link is established and a PIN code arbitrarily created by the server. The mobile unit further comprises a unit for determining, when the information delivery terminal Bluetooth address possessed by the information delivery terminal is received from the information delivery terminal, whether or not the information delivery terminal Bluetooth address is present in the link information and transmitting, when it is determined that the information delivery terminal Bluetooth address is present in the link information, the mobile unit Bluetooth address possessed by the mobile unit to the information delivery terminal; a unit for transmitting, when a link authentication request for a Bluetooth link with the mobile unit is received from the information delivery terminal having transmitted the mobile unit Bluetooth address, the PIN code included in the link information to the information delivery terminal; and a unit for conducting the Bluetooth authentication with the information delivery terminal having transmitted the PIN code. The mobile unit thereby acquires the information from the information delivery terminal.

The mobile unit creates a link key when the mobile unit conducts the Bluetooth authentication with the information delivery terminal and stores the link key together with the link information in a link database possessed by the mobile unit.

In accordance with the present invention, there is provided a server for providing information to a mobile unit and a plurality of information delivery terminals providing information to the mobile unit. The server comprises a unit for acquiring, when a condition of the information delivery terminal for acquiring the information is registered by the mobile unit, from an information delivery terminal database having stored information of the plural information delivery terminals, information of an information delivery terminal satisfying the condition of the information delivery terminal registered by the mobile unit, creating link information required for a Bluetooth link with the information delivery terminal satisfying the condition, and transmitting the link information to the mobile unit; and a unit for transmitting the link information required for a Bluetooth link with the mobile unit to the information delivery terminal satisfying the condition of the information delivery terminal registered by the mobile unit.

The server further comprises an information database for storing therein the information of the mobile unit having registered the condition of the information delivery terminal and the link information required for the Bluetooth link with the mobile unit, with a relationship established between the information of the mobile unit, the link information, and an information delivery terminal name satisfying the condition.

The server further comprises a unit for providing the mobile unit with information of the plural information delivery terminals providing the information to the mobile unit. The condition of the information delivery terminal from which the information is acquired is registered by the mobile unit to the server.

In the server, the link information transmitted to the information delivery terminal includes at least a Bluetooth address of the mobile unit with which a Bluetooth link is established and a PIN code arbitrarily created by the server. The link information transmitted to the mobile unit includes at least a Bluetooth address of the information delivery terminal with which a Bluetooth link is established and a PIN code arbitrarily created by the server.

In accordance with the present invention, there are provided a plurality of information delivery terminals for providing information to a mobile unit. Each of the information delivery terminals comprises a unit for acquiring, from an information delivery terminal database having stored information of the plural information delivery terminals providing information to the mobile unit, information of an information delivery terminal satisfying a condition of an information delivery terminal registered by the mobile unit, creating link information required for a link with the information delivery terminal satisfying the condition, (transmitting the link information to the mobile unit), and acquiring, from the server, link information required for a link with the mobile unit to which the link information is transmitted; and a unit for establishing, according to the link information received from the server, a Bluetooth link with only the mobile unit having received the link information and providing information to the mobile unit.

The information delivery terminal automatically establishes, according to the link information obtained from the server, a Bluetooth link with only the mobile unit having received the link information and provides information to the mobile unit.

In the information delivery terminal, the link information received from the server includes at least a Bluetooth address of the mobile unit with which a Bluetooth link is established and a PIN code arbitrarily created by the server. The information delivery terminal further comprises a unit for transmitting the information delivery terminal Bluetooth address possessed by the information delivery terminal to the mobile unit, a unit for determining, when the mobile unit Bluetooth address possessed by the mobile unit is received from the mobile unit having transmitted the information delivery terminal Bluetooth address, whether or not the mobile unit Bluetooth address is present in the link information and transmitting, when it is determined that the mobile unit Bluetooth address is present in the link information, a link authentication request for a Bluetooth link with the mobile unit to the mobile unit; and a unit for conducting the Bluetooth authentication with the mobile unit at reception of the PIN code from the mobile unit having transmitted the link authentication request if the PIN code thus received matches the PIN code included in the link information. The information delivery terminal thereby provides the information to the mobile unit.

The information delivery terminal further comprises a link database and creates a link key when the information delivery terminal conducts the Bluetooth authentication with the mobile unit and stores the link key together with the link information in the link database.

In the information delivery system and the information delivery method for use with the information delivery system comprising a mobile unit, a plurality of information delivery terminals for providing information to the mobile unit, and a server for providing information to the mobile unit and the information delivery terminals in accordance with the present invention, the mobile unit registers the server a condition of one of the information delivery terminals from which the information is obtained. The server acquires, from the information delivery terminal database having stored information of the plural information delivery terminals providing information to the mobile unit, information of an information delivery terminal satisfying the condition of the information delivery terminal registered by the mobile unit. The server creates link information required for a link with the information delivery terminal satisfying the condition and then transmits the link information to the mobile unit. The mobile unit receives, from the server, the link information required for a link with the information delivery terminal. The server transmits link information required for a link with the mobile unit to the information delivery terminal satisfying the condition of the information delivery terminal registered by the mobile unit. The information delivery terminal receives the link information from the server, establishes a Bluetooth link with only the mobile unit having received the link information from the server, and provides information to the mobile unit. As a result, it is possible to obtain information desired by the user in any situation while improving security.

In accordance with the present invention, the mobile unit establishes a Bluetooth link with an information delivery terminal providing information and thereby acquires the information. The mobile unit registers, to a server linked via a network thereto, a condition of an information delivery terminal from which the information is acquired and receives, from the server, link information required for a link with an information delivery terminal satisfying the condition. A Bluetooth link is automatically established with the server by the information delivery terminal matching the link information received from the server. The server acquires the information from the information delivery terminal. Resultantly, information desired by the user can be obtained in any situation while improving security.

In the server for providing information to a mobile unit and a plurality of information delivery terminals providing information to the mobile unit in accordance with the present invention, there is acquired, when a condition of the information delivery terminal for acquiring the information is registered by the mobile unit, from an information delivery terminal database having stored information of the plural information delivery terminals, information of an information delivery terminal satisfying the condition of the information delivery terminal registered by the mobile unit. Link information required for a Bluetooth link with the information delivery terminal satisfying the condition is created and is transmitted to the mobile unit. The link information required for a Bluetooth link with the mobile unit is transmitted to the information delivery terminal satisfying the condition of the information delivery terminal registered by the mobile unit. Therefore, while guaranteeing improved security, information desired by the user can be provided from the information delivery terminal side to the user side. The mobile unit side can acquire in any situation information desired by the user while improving security.

In each of the plural information delivery terminals for providing information to a mobile unit in accordance with the present invention, there is acquired, from an information delivery terminal database having stored information of the plural information delivery terminals providing information to the mobile unit, information of an information delivery terminal satisfying a condition of an information delivery terminal registered by the mobile unit. Link information required for a link with the information delivery terminal satisfying the condition is created. (The link information is sent to the mobile unit). There is also acquired, from the server, link information required for a link with the mobile unit to which the link information is transmitted. According to the link information received from the server, a Bluetooth link is established with only the mobile unit having received the link information such that information is provided to the mobile unit. Resultantly, it is guaranteed to provide information desired by the user to the user side while improving security.

BRIEF DESCRIPTION OF THE DRAWINGS

The objects and features of the present invention will become more apparent from the consideration of the following detailed description taken in conjunction with the accompanying drawings in which:

FIG. 3 is a block diagram showing a configuration example of a Bluetooth unit included in a portable terminal and an information delivery terminal as constituent components of an information delivery system in accordance with the present embodiments;

FIG. 4 is a table showing a data layout example of an information delivery terminal database of a server as a constituent component of an information delivery system in accordance with the present embodiments;

FIG. 5 is a table showing a data layout example of a user information database of a server as a constituent component of an information delivery system in accordance with the present embodiments;

FIG. 7 is a table showing a data layout example of a link information database of a portable terminal as a constituent component of an information delivery system in accordance with the present embodiments;

FIG. 8 is a flowchart showing steps of processing executed by an information delivery system in accordance with the present embodiments; and FIG. 9 is a flowchart showing steps of processing in which an information delivery terminal and a portable terminal automatically establish a Bluetooth link in an information delivery system in accordance with the present embodiments.

DESCRIPTION OF THE EMBODIMENTS

Figure 2:
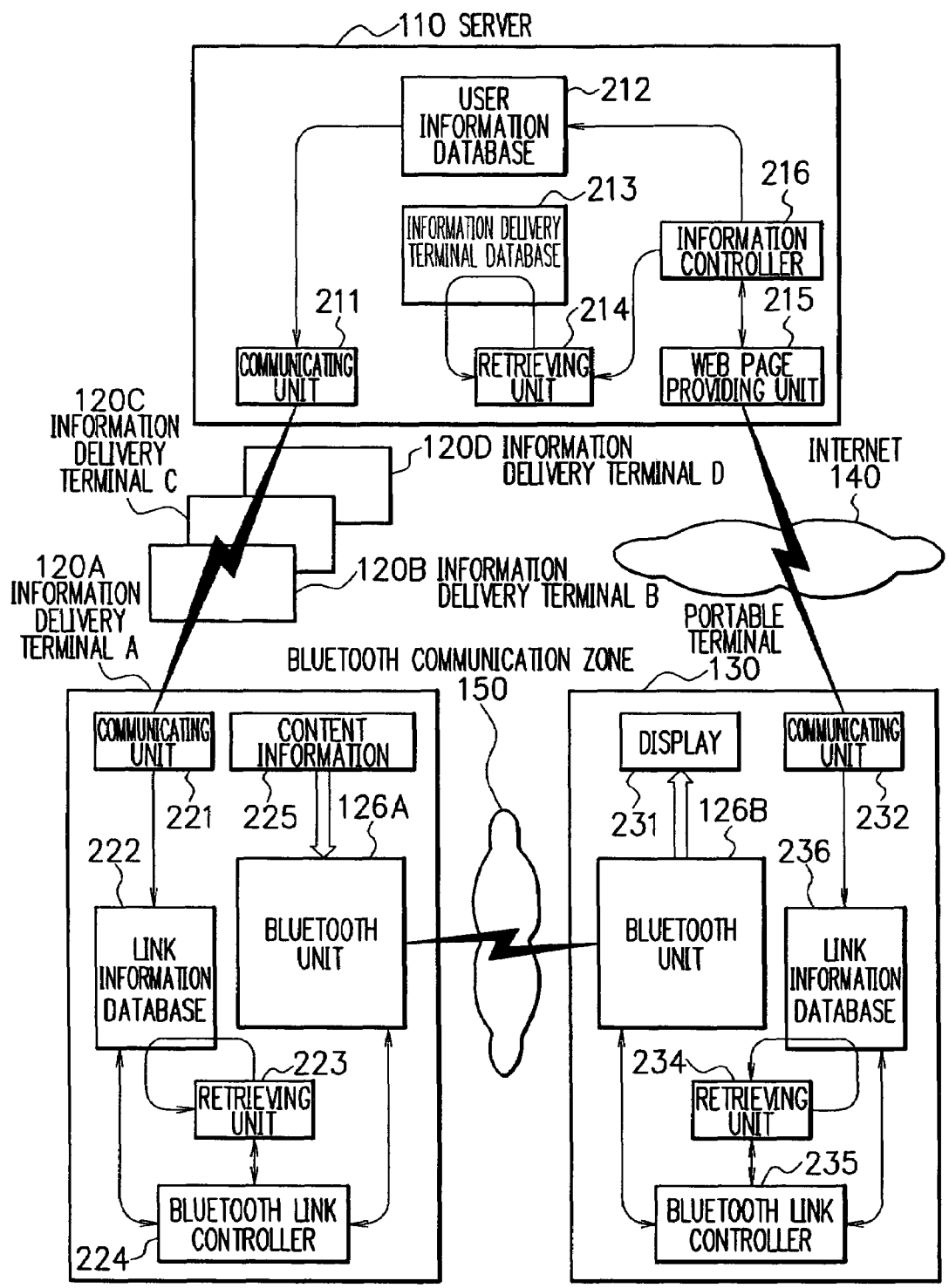
FIG. 2 is a block diagram showing an internal configuration of constituent components of an information delivery system in accordance with the present embodiments.

Referring first to FIG. 2, description will be given of an aspect of the present invention.

In accordance with one aspect of the present invention, there is provided an information delivery system including a portable terminal 130 as a mobile unit, a plurality of information delivery terminals 120 for providing information to the portable terminal 130 as the mobile unit, and a server 110 for providing information to the portable terminal 130 and the information delivery terminals 120. In the system, the portable terminal 130 registers to the server 110 a condition of one of the information delivery terminals 120 from which the information is obtained. The server 110 acquires, from an information delivery terminal database having stored information of the plural information delivery terminals 120 providing information to the portable terminal 130, information of an information delivery terminal 120 satisfying the condition of the information delivery terminal 120 registered by the portable terminal 130, creates link information required for a link with the information delivery terminal 120 satisfying the condition, and transmits the link information to the portable terminal 130. The portable terminal 130 receives from the server 110 the link information required for a link with the information delivery terminal 120. The server 110 then transmits link information required for a link with the portable terminal 130 to the information delivery terminal 120 satisfying the condition of the information delivery terminal 120 registered by the portable terminal 130. The information delivery terminal 120 receives the link information required for a link with the portable terminal 130 from the server 110. The terminal 120 establishes a Bluetooth link with only the portable terminal 130 having received the link information from the server 110 to provide information to the portable terminal 130.

First Embodiment

Referring now to the accompanying drawings, description will be given of an information delivery system in accordance with the present invention.

Figure 1:
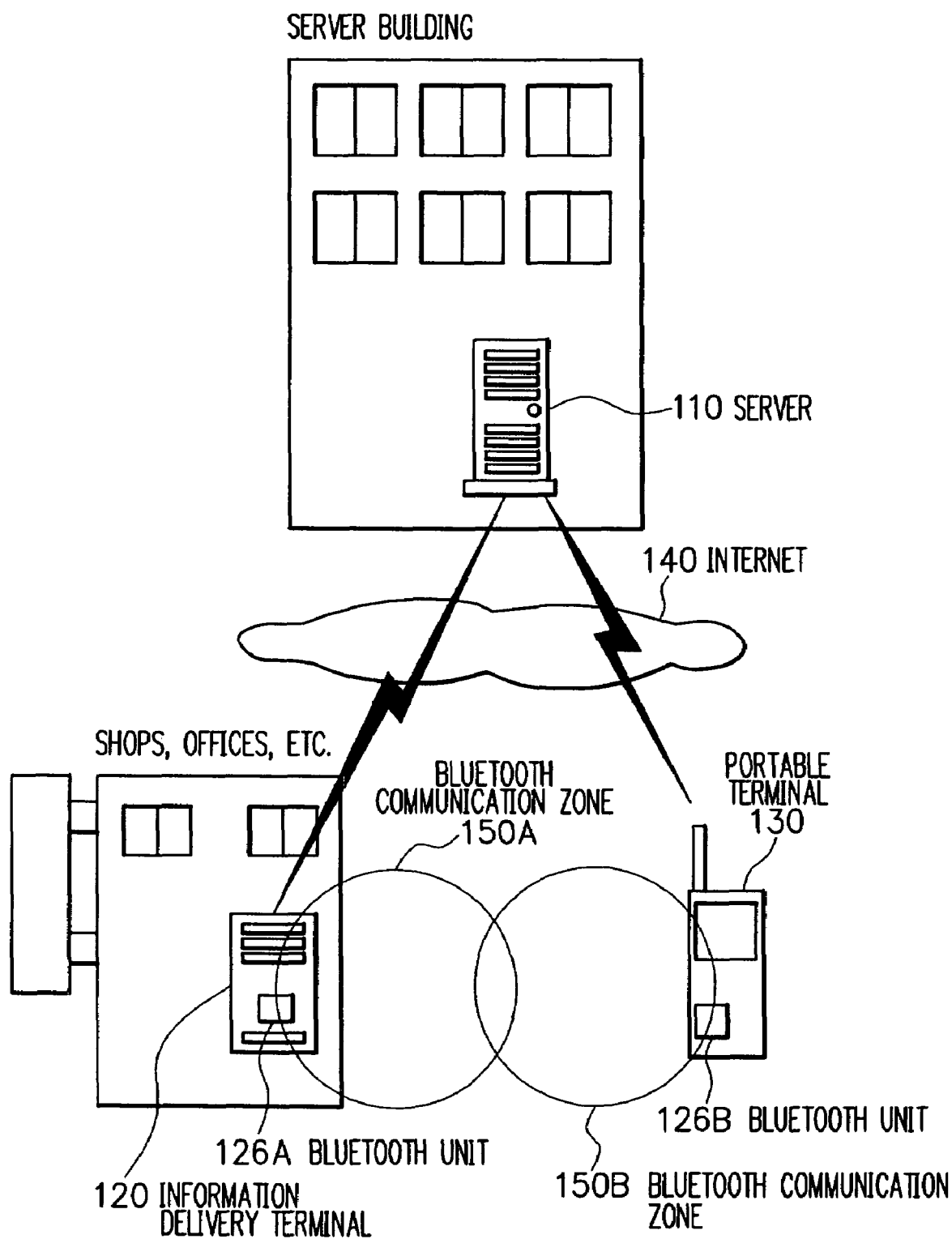
FIG. 1 is a schematic block diagram showing a configuration of an information delivery system in accordance with the present embodiments.

Referring first to FIG. 1, description will be given of a configuration example of an information delivery system in accordance with the present invention. FIG. 1 illustratively shows a configuration example of an information delivery system using a portable terminal in accordance with the present invention.

The information delivery system of the present invention includes a server 110, information delivery terminals 120, and a portable terminal 130. The server 110 is connected via the internet 140 to each information delivery terminal 120. The server 110 is coupled via the internet 140 with the portable terminal 130. The information delivery terminal 120 and the portable terminal 130 configure a communication system to communicate information according to Bluetooth. The terminals 120 and 130 respectively include blue tooth units 126A and 126B so that information is communicated according to Bluetooth via communicable Bluetooth communication zones.

Referring now to FIG. 2, description will be given in detail of an internal configuration of constituent components of the information delivery system shown in FIG. 1.

[Configuration of Server 110]

The server 110 is an information processor to control, in a unified or centralized fashion, information of information delivery terminals 120 installed at respective locations. The server 110 communicates information via a communication network such as the internet 140 with the portable terminal 130 of a user. The server 110 includes a communicating unit 211, a user information database 212, an information delivery terminal database 213, a retrieving unit 214, a web page providing unit 215, and an information controller 216.

The web page providing unit 215 enables an access thereto via a communication network such as the internet 140 from the portable terminal 130 to conduct information communication via a web page access with the portable terminal 130. The unit 215 acquires, from the portable terminal 130, content information desired by a user possessing the portable terminal 130, regional information of regions where delivery of the content information is desired, and user inherent information such as a Bluetooth address of the portable terminal 130.

The user information database 212 is a data base to keep therein information unique to the side of the portable terminal 130 of the user, the information being attained through the web page providing unit 215. The unique information of the portable terminal 130 of the user kept in the database 212 is transmitted by the communicating unit 211 to the information delivery terminals 120.

The information delivery terminal database 213 is a database to store therein information on the side of the information delivery terminals 120 on the information providing side. Using the database 213, the retrieving unit 214 retrieves one of the information delivery terminals 120 which contains content information desired by the user.

The retrieving unit 214 accesses the database 213 to retrieve therefrom one of the information delivery terminals 120 which contains content designated by the user.

The information controller 216 includes a function to store in the user information database 212 unique information on the portable terminal side sent from the user. The controller 216 also includes a function to arbitrarily create a Personal Identification Number (PIN) code required to conduct Bluetooth communication between the portable terminal 130 and the information delivery terminal 120. A retrieval result obtained when the retrieval unit 214 conducts retrieval through the information delivery terminal database 213 and the PIN code created by the information controller 216 are returned by the web page providing unit 215 to the portable terminal 130 when the terminal 130 of the user accesses a web page of the server 110.

The communicating unit 211 sends to the side of the information delivery terminals 120 the PIN code arbitrarily generated by the information controller 216 and the unique information on the side of the user's portable terminal 130 stored in the user information database 212.

[Configuration of Information Delivery Terminal 120]

The information delivery terminal 120 includes a communicating unit 221, a link information database 222, a retrieving unit 223, a Bluetooth link controller 224, a Bluetooth unit 126A, and content information 225 to be provided from the information delivery terminal 120.

The communicating unit 221 receives the unique information on the side of the portable terminal 130 kept in the user information database 212 of the server 110. The unique information thus received by the unit 221 is kept in the link information database 222.

The content information 225 is content information kept in the information delivery terminal 120 and is provided via the Bluetooth unit 126A to the portable terminal 130 on the user side.

The Bluetooth link controller 224 controls the Bluetooth unit 126A, the link information database 222, and the retrieving unit 223 according to Bluetooth information obtained from the Bluetooth unit 126A. The controller 224 accordingly controls a Bluetooth link with the portable terminal 130.

[Configuration of Portable Terminal 130]

The portable terminal 130 includes a display 231, a communicating unit 232, a retrieving unit 234, a Bluetooth link controller 235, a Bluetooth unit 126B, and a link information database 236.

The communicating unit 232 accesses a web page provided by the server 110 and sends a content genre desired by the user and regional information for the content delivery to the server 110. The unit 232 receives from the server 110 a Bluetooth address of an associated information delivery terminal 120 and a PIN code necessary for a Bluetooth link with the information delivery terminal 120. Information received by the communicating unit 232 from the server 110 is stored to be kept in the link information database 236.

The Bluetooth unit 126B conducts Bluetooth communication with the side of the information delivery terminals 120. The unit 126B receives content information via Bluetooth communication from the terminal 120. Information received by the Bluetooth unit 126B via Bluetooth communication from the terminal 120 is displayed on the display 231.

The Bluetooth link controller 235 supervises the Bluetooth unit 126B, the retrieving unit 234, and the link information database 236 and controls a Bluetooth link with the information delivery terminal 120.

FIG. 3 shows a configuration example of the Bluetooth units 126A and 126B of the information delivery terminal 120 and the portable terminal 130, respectively. The Bluetooth unit 126 primarily includes a wireless communication unit 311, an antenna 310, and a baseband unit 312 to conduct Bluetooth communication by controlling the wireless communication unit 311 and associated constituent components.

Referring next to FIGS. 4 and 5, description will be given of data layout examples of the information delivery terminal data base 213 and the user information database 212 of the server 110. FIG. 4 shows a data layout example of the database 213 and FIG. 5 shows a data layout example of the database 212.

As can be seen from FIG. 4, the information delivery terminal database 213 includes entries in association with an information delivery terminal name 400. Each entry includes a content genre 401 indicating a genre of content possessed by the associated information delivery terminal 120, a region name 402 indicating a region in which the information delivery terminal 120 is installed, and an information delivery terminal Bluetooth address 403 indicating a Bluetooth address of the terminal 120.

The user information database 212 includes entries corresponding to an information delivery terminal name 400 as shown in FIG. 5. Each entry includes a user name 411 of a user to use the associated information delivery terminal, a user terminal Bluetooth address 412 indicating a Bluetooth address of a portable terminal 130 of the user, and a PIN code 413 including information required to set a Bluetooth link.

Figure 6:
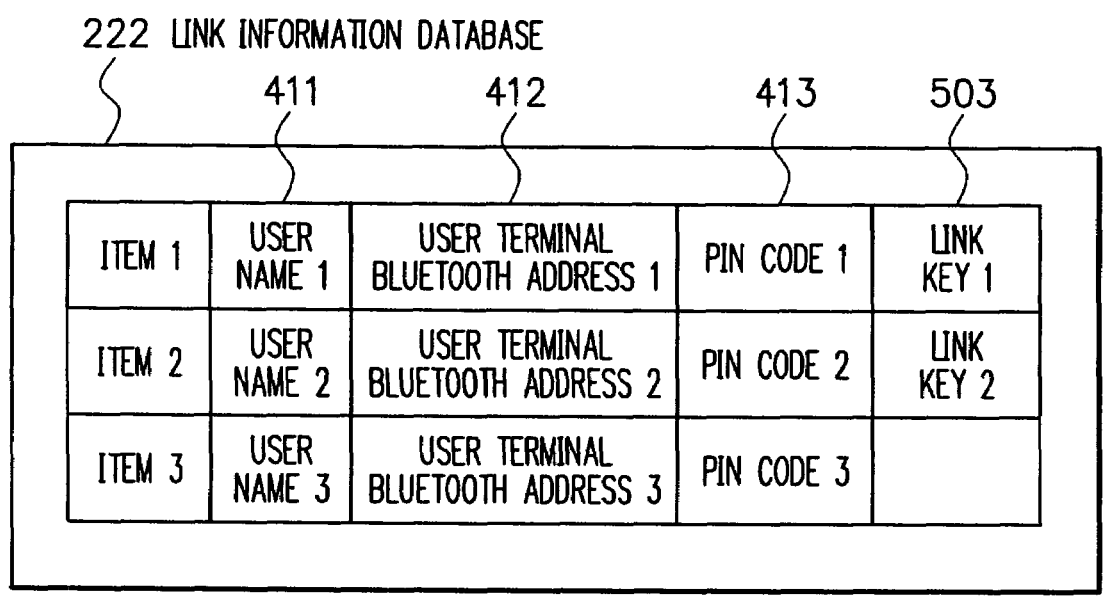
FIG. 6 is a table showing a data layout example of a link information database of an information delivery terminal as a constituent component of an information delivery system in accordance with the present embodiments.

Referring now to FIG. 6, description will be given of an example of a data layout of the link information database 222 of the information delivery terminal 120 shown in FIG. 2.

The database 222 includes entries in association with a user name 411 of a user. Each entry includes a user terminal Bluetooth address 412 indicating a Bluetooth address of a portable terminal 130 of the user and a PIN code 413 including information required to set a Bluetooth link. When Bluetooth authentication of the information delivery terminal 120 is completed for the portable terminal 130, the database 222 also stores and manages a link key 503 together with the Bluetooth address 412 and the PIN code 413.

Next, referring to FIG. 7, description will be given of a data layout example of information stored in the link information database 236 of the portable terminal 130 shown in FIG. 2.

The database 236 includes entries in association with an information delivery terminal name 400. Each entry includes an information delivery terminal Bluetooth address 403 indicating a Bluetooth address of an information delivery terminal 120 and a PIN code 413 storing information required to set a Bluetooth link. When Bluetooth authentication of the portable terminal 130 is completed for the information delivery terminal 120, the database 236 also stores and manages a link key 603 together with the Bluetooth address 403 and the PIN code 413.

[Processing of Information Delivery System]

Referring now to FIGS. 2 and 8, description will be given of processing executed by the information delivery system in accordance with the present invention.

First, the information delivery terminal 120 sends content information provided by the terminal 120 to the server 110. Specifically, as can be seen from FIG. 4, the content information includes a content genre name 401 which is associated with an information delivery terminal name 400 and which is provided by the terminal 120; a region name 402 indicating a region of installation of the terminal 120, and an information delivery terminal Bluetooth address 403 uniquely assigned to the terminal 120. As a result, according to the information received from the terminal 120, the server 110 creates an information delivery terminal database 213 as shown in FIG. 4 (step S801). It is also possible that the server 110 accesses the terminal 120 side to obtain content information provided by each terminal 120 in association with the information delivery terminal name 400, the content information including a content genre name 401 provided by the terminal 120; a region name 402 of a region of installation of the terminal 120, and an information delivery terminal Bluetooth address 403 uniquely assigned to the terminal 120. It is possible for the server 110 to periodically access each information delivery terminal 120 using the information delivery terminal name 400 stored in the information delivery terminal database 213 shown in FIG. 4 to acquire information from the terminal 120 to update information in the database 213.

Subsequently, the server 110 produces a web page for the user by the web page providing unit 215 and provides the web page to the user side (step S802). The user operates his or her portable terminal 130 to access via the communicating unit 232 of the terminal 130 the web page provided by the web page providing unit 215. The user then registers information required to attain content information to the user information database 212 on the server 110 side (step S803). The information required for the registration to the database 212 includes a user name 411, a genre name 401 of content of which information is to be provided, a region name 402 of a region for the terminal 120, and a user terminal Bluetooth address 412 unique to the portable terminal 130 as shown in FIGS. 4 and 5.

The server 110 then transmits the information received from the terminal 130 via the web page providing unit 215 of the server 110 to the information controller 216. According to the genre name 401 of content and the regional name 402 of a region for the information delivery terminal selected from the information received from the terminal 130, the controller 216 retrieves, from the database 213 by the retrieving unit 214 of the server 110, an information delivery terminal name 400 meeting a condition desired by the user (step S804).

The information delivery terminal database 213 has a data layout, for example, as shown in FIG. 4. When the content genre name 401 and the regional name 402 received from the portable terminal 130 are "content genre A" and "regional name A", the retrieval result indicates "item 1" of the database 213 shown in FIG. 4. Therefore, the information controller 216 receives via the retrieving unit 214 a retrieval result in which the information delivery terminal name 400 is "information delivery terminal A" and the information delivery terminal Bluetooth address 403 is "information delivery terminal Bluetooth address 1".

Next, the information controller 216 uniquely creates for each user a PIN code required for a Bluetooth link and configures a user information database 212 in association with the information delivery terminal name 400 retrieved in step S804 as shown in FIG. 5 (step S805). In the example, as an information delivery terminal name 400 satisfying the condition desired by the user, "information delivery terminal A" corresponding to "item 1" is retrieved. In the entry of "item 1" of FIG. 5, "user name 1", "user terminal Bluetooth address 1", and "PIN code 1" are stored in association with "information delivery terminal A".

Although not shown, when the information delivery terminal 120 desired by the user is absent as a result of the retrieval of the information delivery terminal 120 in step S804, the information controller 216 conducts neither the PIN code creation for each user nor the storing operation in the user information database 212. The information controller 216 notifies a message of absence of the information delivery terminal 120 desired by the user to the portable terminal 130.

The controller 216 sends the retrieval result of the information delivery terminal 120 in step S804 and the PIN code in step S805 via the web page providing unit 215 to the portable terminal 130 (step S806). As a result, the terminal 130 receives via the communicating unit 232 of the terminal 130 the retrieval result of the information delivery terminal 120 and the PIN code from the server 110.

The retrieval result of the information delivery terminal 120 of step S804 which the information controller 216 sends to the user's portable terminal 130 includes the information delivery terminal name 400 and the information delivery terminal Bluetooth address 403 shown in FIG. 4. The PIN code created in step S805 is the PIN code 413 associated with the information delivery terminal name 400 of FIG. 5. In the example, the information controller 216 has already retrieved "item 1" of the information delivery terminal database 213. Therefore, "information delivery terminal name A" and "information delivery terminal Bluetooth address 1" as well as "PIN code 1" which is stored in the entry of "item 1" in the database 212 of FIG. 5 and which is arbitrarily created by the information controller 216 are transmitted via the web page providing unit 215 to the portable terminal 130.

The communicating unit 232 of the terminal 130 then stores in the link information database 236 the retrieval result of the information delivery terminal 120 and the PIN code received from the server 110 (step S807). The database 236 includes information as shown in FIG. 6. In association with an information delivery terminal name 400, an information delivery terminal Bluetooth address 403 corresponding to the information delivery terminal 120 and a PIN code 413 required for authentication to be conducted with the information delivery terminal side are stored and managed in the database 236.

The information control unit 216 of the server 110 also sends the user name 411, the user terminal Bluetooth address 412, and the PIN code 413 stored in the user information database 212 via the communication unit 211 to the information delivery terminal side (step S808). The terminal 120 then receives via the communicating unit 221 thereof the user name 411, the user terminal Bluetooth address 412, and the PIN code 413 sent from the server 110. The communicating unit 221 of the terminal 120 stores these items 411, 412, and 413 in the link information database 222 of the terminal 120 (step S809).

The database 222 includes entries of information as shown in FIG. 5. The user terminal Bluetooth address 412 and the PIN code 413 are stored to be managed in the database 222 in association with the user name.

As a result, the portable terminal 130 of the user automatically establishes a Bluetooth link only with the information delivery terminal 120 meeting the condition desired by the user. The terminal 120 provides content information through the Bluetooth communication to the portable terminal 130 (step S810).

Next, referring to FIG. 9, description will be given in detail of the processing in which the information delivery terminal 120 and the portable terminal 130 automatically establish a Bluetooth link to provide content information from the terminal 120 to the portable terminal 130. It is assumed in the description that the databases 222 (FIG. 5) and 236 (FIG. 6) respectively of the terminals 120 and 130 beforehand stores information received from the server 110.

The information delivery terminal 120 shown in FIG. 2 executes retrieval processing for a Bluetooth module using the Bluetooth unit 126A thereof to search for a portable terminal 130 as a communicating party (step S901). The retrieval is carried out in a range indicated as a Bluetooth retrieval zone 150A in FIG. 1.

The portable terminal 130 of FIG. 2 is in a wait state to make a reply to the retrieval processing by the Bluetooth unit 126A of the information delivery terminal 120. Assume that the terminal 130 moves and the Bluetooth communication zone 150B of the terminal 130 enters the Bluetooth communication zone 150A of the terminal 120. The Bluetooth unit 126B of the portable terminal 130 receives a link request of the information delivery terminal 120 sent from the Bluetooth unit 126A of the terminal 120 and then sends the request to the Bluetooth link controller 235 of the terminal 120 (step S902).

The controller 235 then determines whether or not information (information delivery terminal Bluetooth address 403) unique to the terminal 120 corresponding to the link request is present in the database 236 of the terminal 130. For this purpose, according to the link request of the terminal 120 received from the Bluetooth unit 126B, the controller 235 makes a search through the link information database 236 using the retrieving unit 234 (step S903). The controller 235 then receives a result of the retrieval through the database 236 via the retrieving unit 234 (step S904). According to the retrieval result from the database 236, the Bluetooth link controller 235 executes processing to determine whether or not the Bluetooth link with the information delivery terminal 120 is allowed for the link request (step S905).

If it is determined that the unique information, i.e., the address 403 of the terminal 120 of the current link request has not been registered to the database 236 (absent in step S905), the controller 235 does not execute processing to send a response to the terminal 120. That is, the Bluetooth link processing is not executed. Consequently, the portable terminal 130 stays in the wait state to response to retrieval processing by the Bluetooth unit 126A of the information delivery terminal 120 (step S906).

On the other hand, if it is determined that the unique information, i.e., the address 403 of the terminal 120 of the current link request exists in the database 236 (present in step S905), the controller 235 executes reply processing to send a reply to the terminal 120. The controller 235 allows the Bluetooth unit 126B to conduct a Bluetooth reply (step S907). Since the reply is allowed by the controller 235, the Bluetooth unit 126B makes a response to the link request from the terminal 120 (step S908). The portable terminal 130 starts processing to establish a Bluetooth link with the information delivery terminal 120.

The Bluetooth unit 126A of the terminal 120 receives the response to the link request from the Bluetooth unit 126B of the portable terminal 130. To determine whether or not terminal information, i.e., a user terminal Bluetooth address 412 of the portable terminal 130 exists in the link information database 222, the Bluetooth link controller 224 of the information delivery terminal 120A makes a search through the database 222 using the retrieval unit 223 (step S909).

Resultantly, the controller 224 receives a result of the retrieval through the database 222 via the retrieval unit 223 (step S910). Using the retrieval result from the database 222, the controller 224 determines whether or not the terminal information, i.e., the Bluetooth address 412 of the portable terminal 130 is present therein (step S911). If it is determined as a result of the determination that the Bluetooth address 412 of the terminal 130 is absent from the link information database 222 (absent in step S911), the controller 224 ordinarily executes the Bluetooth link processing (step S912).

If it is determined that the Bluetooth address 412 of the pertinent portable terminal 130 is present in the database 222 (present in step S911), the controller 224 makes the Bluetooth unit 126A execute Bluetooth link processing. The Bluetooth unit 126A sends a Bluetooth link authentication request to the portable terminal 130 (step S913).

The Bluetooth unit 126B of the portable terminal 130 having received the request transmits a PIN code acquisition request for a link with the information delivery terminal 120 to the Bluetooth link controller 235 (step S914). When the PIN code acquisition request is received, the controller 235 attains a PIN code from the link information database 236 using the retrieval unit 234 (step S915) and sends the PIN code to the Bluetooth unit 126B (step S916). Having received the PIN code from the controller 235, the Bluetooth unit 126B sends the PIN code to the Bluetooth unit 126A of the information delivery terminal 120 having transmitted the link authentication request (step S916).

When the PIN code of the portable terminal 130 is received, the Bluetooth unit 126A sends to the Bluetooth link controller 224 a PIN code acquisition request for a link with the portable terminal 130 (step S917). Having received the acquisition request, the controller 224 acquires a PIN code from the database 222 using the retrieval unit 223 (step S918) and sends the PIN code to the Bluetooth unit 126A.

This initiates the Bluetooth authentication processing between the Bluetooth unit 126A of the information delivery terminal 120 and the Bluetooth unit 126B of the portable terminal 130 using the PIN code (step S919). If the PIN code matches between the terminals 130 and 120, the authentication processing is normally terminated. Therefore, a link key is generated in the Bluetooth unit 126B of the portable terminal 130 and the Bluetooth unit 126A of the information delivery terminal 120. The link key created by the Bluetooth unit 126A is delivered to the Bluetooth link controller 224, which then stores the link key in the database 222 (FIG. 6: steps S922 and S923). The link key created by the Bluetooth unit 126B is delivered to the Bluetooth link controller 235. The controller 235 then stores the link key in the database 236 (FIG. 7: steps S920 and S921).

Through the processing described above, the portable terminal 130 and the information delivery terminal 120 automatically execute the Bluetooth authentication processing. When the processing is terminated, the information delivery terminal 120 provides content information desired by the user to the portable terminal 130.

As above, the information delivery terminal 120 sends an information delivery terminal Bluetooth address possessed by the terminal 120 to the portable terminal 130 as a mobile unit. When the Bluetooth address of the terminal 120 is received, the terminal 130 makes a check to determine whether or not the Bluetooth address is present in the link information database 236 of the portable terminal 130. If it is determined that the address is in the database 236, the portable terminal 130 sends a user terminal Bluetooth address possessed by the terminal 130 to the information delivery terminal 120. When the Bluetooth address of the terminal 130 is received, the information delivery terminal 120 determines whether or not the address is included in the link information database 222 of the terminal 120. If it is determined that the address exists in the database 222, the terminal 120 delivers, to the portable terminal 130, a link authentication request for a Bluetooth link with the terminal 130. When the request is received from the terminal 120, the portable terminal 130 transmits to the terminal 120 a PIN code included in the link information database 236 of the portable terminal 130. When the PIN code is received from the terminal 130 and if the PIN code matches with the PIN code included in the database 222 of the terminal 120, the terminal 120 carries out Bluetooth authentication with the portable terminal 130 and then provides content information to the terminal 130.

Therefore, only by registering information to acquire his or her desired content information to the server 110, the user can automatically obtain the desired content information from the side of the information delivery terminals 120 without operating his or her portable terminal 130. Even when a link request is received from a plurality of information delivery terminals 120, the portable terminal 130 establishes a Bluetooth link with only the terminal 120 including the desired information. This consequently guarantees security on the side of the portable terminal 130. Additionally, it is not necessary to conduct operation to select one of the information delivery terminals 120 to be linked with the portable terminal 130 of the user. Advantageously, the operational load imposed on the user can be reduced.

Second Embodiment

Next, a second embodiment will be described.

The first embodiment includes step S901 as shown in FIG. 9 in which the Bluetooth unit search is conducted using the Bluetooth unit 126A of the information delivery terminal 120 to retrieve a portable terminal 130 as a link destination. In the second embodiment, the user operates a console section of the portable terminal 130 to establish a link with the side of the terminals 120 using the Bluetooth unit 126B of the portable terminal 130. That is, the processing is executed beginning at step S907 shown in FIG. 9. This consequently simplifies the processing which the portable terminal 130 executes to acquire content information from the side of the terminals 120.

Third Embodiment

Description will be given of a third embodiment.

In step S905 of FIG. 9 of the first embodiment, when it is determined that the unique information, i.e., the information delivery terminal Bluetooth address 403 of the information delivery terminal 120 is present in the link information database 236 (present in step S905), the Bluetooth link controller 235 executes the reply processing to send a response to the terminal 120. The Bluetooth unit 126B delivers a user terminal Bluetooth address to the terminal 120 to start the Bluetooth link processing with the terminal 120. In the third embodiment, when it is determined that the unique information, i.e., the Bluetooth address 403 of the terminal 120 is present in the database 236 (present in step S905), the Bluetooth link controller 235 attains a PIN code from the link information database 222 using the retrieval unit 223 (step S915) to transmit an associated PIN code via the Bluetooth unit 126B to the information delivery terminal 120 (step S916) to thereby initiate the Bluetooth link processing with the terminal 120. As a result, the processing of steps S907 to S914 becomes simpler. This simplifies the operation to be conducted up to the time when the portable terminal 130 acquires content information from the information delivery terminal 120.

Fourth Embodiment

Next, description will be given of a fourth embodiment.

In the system configuration of the first embodiment, the server 110 and the information delivery terminal 120 are separated from each other in FIG. 1. According to the system configuration of the fourth embodiment, the server 110 may include the function of the information delivery terminal 120 or the terminal 120 may include the function of the server 110. According to this structure in accordance with the present invention, the information delivery system can be configured without using the communicating units 211 of the server 110 and the communicating unit 221 of the information delivery terminal 120 shown in FIG. 2.

Fifth Embodiment

Subsequently, a fifth embodiment will be described.

In the system configuration of the first embodiment shown in FIG. 2, the server 110 communicates information with the portable terminal 130 via a web page supplied by the web page providing unit 215 of the server 110. In the fifth embodiment, information is communicated by electronic mail using a web page. Therefore, in the system configuration of the fifth embodiment of the information delivery system, the web page providing unit 215 of the server 110 and the communicating unit 232 of the portable terminal 130 shown in FIG. 2 are replaced respectively by e-mail units. Using the mail unit additionally disposed in the portable terminal 130, information unique to the user is sent by e-mail to the server 110. The mail unit thus disposed in the server 110 transmits by e-mail the unique information of the information delivery terminal to the portable terminal 130.

Sixth Embodiment

Description will now be given of a sixth embodiment.

In the first embodiment, content information varies for each information delivery terminal 120 and content information of one content genre is kept in each associated information delivery terminal 120 as shown in FIG. 4. The configuration of the sixth embodiment differs from that of the first embodiment and allows each information delivery terminal 120 to keep content information of a plurality of content genres. The content information kept in the information delivery terminal 120 is not necessarily fixed. There may be employed a configuration in which according to a request from the user, content information required by the user is delivered from the server 110 to the side of the information delivery terminals 120. To deal with a situation in which, for example, the contents desired by the user are absent from the information delivery terminals 120 existing in a zone in which the user accesses the system, it is enough to arrange in the server 110 a storage to keep the contents. That is, the contents desired by the user are delivered via the communicating unit 211 to the side of the information delivery terminals 120.

The embodiments described above are embodiments suitable for the present invention and can be changed and modified within the scope of the present invention. For example, although content information is delivered by the information delivery system of these embodiments, the information to be delivered is not restricted by the embodiments. That is, various information items can be delivered.

The information delivery system, the information delivery method, the mobile unit, the server, and the information delivery terminal in accordance with the present invention are applicable to, for example, an advertisement information delivery system in which information such as advertisement information and product guidance information are delivered to portable terminals via Bluetooth communication and a guidance information delivery system in which information such as building guidance information and store guidance information are transmitted to portable terminals via Bluetooth communication.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information delivery system, comprising:
    a mobile unit;
    a plurality of information delivery terminals for providing content information to the mobile unit; and
    a server for providing information to the mobile unit and the information delivery terminals, wherein:
    the mobile unit comprises:
    means for registering to the server a condition of one of the information delivery terminals from which the content information is obtained;
    means for receiving, from the server, and storing link information required for a link with the information delivery terminal from which the information is obtained;
    means for accessing stored link information; and
    means for establishing a Bluetooth link with the information delivery terminal according to the link information received from the server and thereby acquiring the information;
    the server comprises:
    means presenting a selection of content information to a user accessing the server;
    a user information database containing information obtained by user registration to attain content information from one of said plurality of information delivery terminals;
    an information delivery terminal database for storing therein information of the information delivery terminals providing information to the mobile unit;
    means for acquiring, from the information delivery terminal database, information of an information delivery terminal satisfying the condition of the information delivery terminal registered by the mobile unit;
    means for creating link information required for a link with the information delivery terminal satisfying the condition;
    means for transmitting the link information to the mobile unit; and
    means for transmitting link information required for a link with the mobile unit to the information delivery terminal satisfying the condition of the information delivery terminal registered by the mobile unit; and
    each of the plurality of information delivery terminals comprises:
    means for receiving, from the server, and storing link information required for a link with the mobile unit;
    means for storing content information; and
    means for establishing, according to the link information received from the server, a Bluetooth link with only the mobile unit having received the link information from the server, and for providing information to the mobile unit, wherein:
    the link information which the information delivery terminal received from the server includes at least a Bluetooth address of the mobile unit with which a Bluetooth link is established and a personal identification number (PIN) code arbitrarily created by the server;
    the link information which the mobile unit receives from the server includes at least a Bluetooth address of the information delivery terminal with which a Bluetooth link is established and a PIN code arbitrarily created by the server;
    the information delivery terminal comprises means for establishing a Bluetooth link with the mobile unit using at least one item selected from among an information delivery terminal Bluetooth address possessed by the information delivery terminal, the Bluetooth address of the mobile unit, and the PIN code arbitrarily created by the server and provides the information to the mobile unit; and
    the mobile unit comprises means for establishing a Bluetooth link with the information delivery terminal using at least one item selected from among a mobile unit Bluetooth address possessed by the mobile unit, the Bluetooth address of the information delivery terminal, and the PIN code arbitrarily created by the server and acquires the information.

2. An information delivery system in accordance with claim 1, wherein the user information database stores therein information of the mobile unit having registered the condition of the information delivery terminal and the link information required for a link with the mobile unit, with a relationship established among the information of the mobile unit, the link information, and an information delivery terminal name satisfying the condition.

3. An information delivery system in accordance with claim 1, wherein:
    the server comprises means for providing the mobile unit with information of a plurality of information delivery terminals providing the information; and
    the mobile unit registers to the server, according to the information of the plural information delivery terminals provided by the server, the condition of the information delivery terminal from which the information is acquired.

4. An information delivery system in accordance with claim 1, wherein:
    the information delivery terminal automatically establishes, according to the link information, a Bluetooth link with only the mobile unit having received the link information, and provides information to the mobile unit; and
    the mobile unit obtains the information.

5. An information delivery system in accordance with claim 1, wherein:
    the information delivery terminal comprises:
    means for transmitting the information delivery terminal Bluetooth address possessed by the information delivery terminal to the mobile unit;
    means for determining, when the mobile unit Bluetooth address possessed by the mobile unit is received from the mobile unit having received the information delivery terminal Bluetooth address, whether or not the mobile unit Bluetooth address is present in the link information and for transmitting, when it is determined that the mobile unit Bluetooth address is present in the link information, a link authentication request for a Bluetooth link with the mobile unit to the mobile unit; and
    means for conducting the Bluetooth authentication with the mobile unit at reception of the PIN code from the mobile unit having received the link authentication request if the PIN code thus received matches the PIN code included in the link information, the information delivery terminal providing the information to the mobile unit; and the mobile unit comprises:

means for determining, when the information delivery terminal Bluetooth address possessed by the information delivery terminal is received from the information delivery terminal, whether or not the information delivery terminal Bluetooth address is present in the link information and for transmitting, when it is determined that the information delivery terminal Bluetooth address is present in the link information, the mobile unit Bluetooth address possessed by the mobile unit to the information delivery terminal;

means for transmitting, when the link authentication request is received from the information delivery terminal having received the mobile unit Bluetooth address, the PIN code included in the link information to the information delivery terminal; and means for conducting the Bluetooth authentication with the information delivery terminal having transmitted the PIN code, the mobile unit acquiring the information.

6. An information delivery system in accordance with claim 5, wherein:

the information delivery terminal creates a link key when the information delivery terminal conducts the Bluetooth authentication with the mobile unit;

the information delivery terminal comprises a link database for storing therein the link key together with the link information;

the mobile unit creates a link key when the mobile unit conducts the Bluetooth authentication with the information delivery terminal; and the mobile unit comprises a link database for storing therein the link key together with the link information.

7. An information delivery method for use with an information delivery system comprising a mobile unit, a plurality of information delivery terminals for providing content information to the mobile unit, and a server for providing information to the mobile unit and the information delivery terminals, the method comprising the steps of:

registering by the mobile unit to the server a condition of one of the information delivery terminals from which the content information is obtained;

acquiring by the server, from an information delivery terminal database having stored information of the information delivery terminals providing information to the mobile unit, information of an information delivery terminal satisfying the condition of the information delivery terminal registered by the mobile unit;

creating by the server link information required for a link with the information delivery terminal satisfying the condition, and transmitting the link information to the mobile unit;

receiving by the mobile unit, from the server, the link information required for a link with the information delivery terminal;

transmitting by the server, link information required for a link with the mobile unit to the information delivery terminal satisfying the condition of the information delivery terminal registered by the mobile unit; and receiving by the information delivery terminal the link information from the server, establishing a Bluetooth link with only the mobile unit having received the link information from the server, and providing information to the mobile unit, wherein:

the link information which the information delivery terminal received from the server includes at least a Bluetooth address of the mobile unit with which a Bluetooth link is established and a PIN code arbitrarily created by the server;

the link information which the mobile unit receives from the server includes at least a Bluetooth address of the information delivery terminal with which a Bluetooth link is established and a PIN code arbitrarily created by the server, the method further comprising the steps of:

transmitting by the information delivery terminal the information delivery terminal Bluetooth address possessed by the information delivery terminal to the mobile unit;

determining by the mobile unit, when the information delivery terminal Bluetooth address possessed by the information delivery terminal is received from the information delivery terminal, whether or not the information delivery terminal Bluetooth address is present in the link information and transmitting, when it is determined that the information delivery terminal Bluetooth address is present in the link information, the mobile unit Bluetooth address possessed by the mobile unit to the information delivery terminal;

determining by the information delivery terminal, when the mobile unit Bluetooth address possessed by the mobile unit is received from the mobile unit, whether or not the mobile unit Bluetooth address is present in the link information and transmitting, when it is determined that the mobile unit Bluetooth address is present in the link information, a link authentication request for a Bluetooth link with the mobile unit to the mobile unit;

transmitting by the mobile unit, when the link authentication request is received from the information delivery terminal, the PIN code included in the link information to the information delivery terminal; and conducting by the information delivery terminal the Bluetooth authentication with the mobile unit at reception of the PIN code from the mobile unit if the PIN code thus received matches the PIN code included in the link information and providing the information to the mobile unit.

8. An information delivery method in accordance with claim 7, further comprising the step of storing in an information database the information of the mobile unit having registered the condition of the information delivery terminal and the link information required for a link with the mobile unit, with a relationship established among the information of the mobile unit, the link information, and an information delivery terminal name satisfying the condition.

9. An information delivery method in accordance with claim 7, further comprising the steps of:

providing, by the server, the mobile unit with information of the plural information delivery terminals providing the information; and registering by the mobile unit to the server, according to the information of the plural information delivery terminals provided by the server, the condition of the information delivery terminal from which the information is acquired.

10. An information delivery method in accordance with claim 7, further comprising the steps of:
- automatically establishing by the information delivery terminal, according to the link information, a Bluetooth link with only the mobile unit having received the link information and providing information to the mobile unit.

11. An information delivery method in accordance with claim 7, further comprising the steps of:
- creating by the information delivery terminal a link key when the information delivery terminal conducts the Bluetooth authentication with the mobile unit and storing the link key together with the link information in a link database possessed by the information delivery terminal; and
- creating by the mobile unit a link key when the mobile unit conducts the Bluetooth authentication with the information delivery terminal and storing the link key together with the link information in a link database possessed by the mobile unit.

* * * * *